United States Patent Office 2,716,064
Patented Aug. 23, 1955

2,716,064
VITAMIN-A PREPARATIONS
Maksymilian K. Koffler, Tel-Aviv, Israel
No Drawing. Application March 10, 1953,
Serial No. 341,600
Claims priority, application Israel December 24, 1952
6 Claims. (Cl. 99—11)

This invention deals with the known problem of preservation of the vitamin contents, mainly vitamin A and to a certain extent also vitamin D, of liver oil, liver extracts, chopped liver or other animal oils or organ preparations for human or animal consumption, whose vitamin contents are apt to decrease rapidly in storage unless special precautions are taken.

It has been found that a highly satisfactory keeping power can be imparted to the vitamin-containing oils or organ preparation by admixing them with citrus peel juice concentrate. The term "peel juice" designates the liquor that can be separated from citrus fruit peel by squeezing or in any other suitable manner, especially after the peel has been subjected to a treatment calculated to destroy the solid-liquid syneresis therein. The destruction of the solid-liquid syneresis of the fresh peel may be obtained by the so-called "liming," a well known process in which the fresh peel, preferably pulped, is admixed with milk of lime and left in contact therewith for a short time. From this mixture the juice can readily be removed by squeezing. The peel juice contains all the soluble components of the peel but no appreciable amount of its insoluble solids.

In order that the concentrates be efficacious preservative agents for the purpose referred to, they should have a ratio of concentration of 1:3 or above. The oil or organ preparation is preferably emulsified with the concentrate. For obtaining stable emulsions the proportion of the concentrate will as a rule have to be not below about 40% by weight of the final product, but under favorable emulsifying conditions the proportion of the concentrate may even be lower. There is no upper limit for the proportion of concentrate, but the higher the proportion thereof, the more liquid will be the final product.

No appreciable difference of action could be observed between the principal kinds of citrus fruit whose peel juice is readily available for technical and commercial purposes, e. g. orange, grapefruit or lemon.

Where it is deemed necessary to protect the preparations in addition from bacterial decomposition, suitable antiseptic agents may be added, and/or the preparations may be subjected to pasteurization, which may be done before or after the admixture of the concentrates.

Nutritional ingredients or preservative agents may be added to the mixture at will.

The pH of the concentrates is preferably selected within the acid range, e. g. in the vicinity of about 3.5 to 4. Where in consequence of the liming, the peel juice has a higher pH, some acid may be added, e. g. citric, sulfuric or hydrochloric acid.

Experiments have shown that the vitamin contents of oils or organ preparations protected by citrus fruit peel juice concentrates have kept without appreciable loss for long periods of time, for so far up to two years, even at the high summer temperatures of a sub-tropical climate.

The invention is illustrated by the following examples to which it is not limited.

Example 1

500 parts by weight of a liver oil containing per gram 4000 I. U. (international units) of vitamin A, are admixed in a vessel fitted with an appropriate stirring gear with 500 parts of orange peel juice concentrate of a concentration of 70° Brix (corresponding to a ratio of concentration of 1:7) and pH 4. The product is a paste which contains 2000 I. U. of vitamin A per gram.

Example 2

200 parts by weight of an animal oil containing 8000 of I. U. of vitamin A per gram are admixed with 800 parts of grapefruit peel juice concentrate of a concentration of 70° Brix (ratio of concentration 1:7) and pH 3.8. The resulting product is a viscous liquor containing 1600 I. U. of vitamin A per gram.

Example 3

500 parts by weight of chopped fish liver containing 4000 I. U. of vitamin A per gram are admixed with 680 parts of a lemon peel juice concentrate of a concentration of 55° Brix (ratio of concentration 1:5.5) and pH 3.5, and with 70 parts of sodium chloride serving as a preservative agent. The paste-like product contains 1600 I. U. of vitamin A per gram. The paste retains its consistency without breaking up in spite of the presence of the sodium chloride.

Example 4

300 parts by weight of liver oil containing 4000 I. U. of vitamin A per gram are admixed with 600 parts of orange peel juice of a concentration of 50° Brix (ratio of concentration 1:5) and pH 4.2, and 100 parts of an aqueous sodium chloride solution of 15% by weight concentration. The product is a highly viscous liquid.

Example 5

400 parts of liver extract containing 4000 I. U. of vitamin A per gram are admixed with 600 parts by weight of orange peel juice concentrate of a concentration of 60° Brix (ratio of concentration 1:6) and pH 3.8, and 5 parts of glycerol ricinoleate as emulsifier. The product is a very stable paste.

I claim:

1. Vitamin-A preparations of high keeping power, containing an animal source of vitamin A in admixture with concentrated citrus fruit peel juice.

2. Vitamin-A preparations of high keeping power, containing an animal source of vitamin A emulsified with concentrated citrus fruit peel juice.

3. Vitamin-A preparations of high keeping power, containing an animal source of vitamin A in admixture with citrus fruit peel juice concentrated to a ratio of concentration of at least 1:3.

4. Vitamin-A preparations of high keeping power, be-stable emulsions of animal sources of vitamin A with concentrated citrus fruit peel juice, the proportion of the latter being at least 40% by weight of the total emulsion.

5. Vitamin-A preparations as claimed in claim 1, wherein the source of vitamin A is a substantially liquid liver preparation.

6. Vitamin-A preparations as claimed in claim 1, wherein the source of vitamin A is chopped liver.

References Cited in the file of this patent

UNITED STATES PATENTS

| 1,886,931 | Alexander | Nov. 8, 1932 |
| 2,375,278 | Buxton | May 8, 1945 |